United States Patent [19]

Kokta

[11] Patent Number: 4,791,020

[45] Date of Patent: Dec. 13, 1988

[54] BONDED COMPOSITES OF CELLULOSE FIBERS POLYETHYLENE

[75] Inventor: Bohuslav V. Kokta, Trois-Rivieres, Canada

[73] Assignee: Novacor Chemicals Ltd., Calgary, Canada

[21] Appl. No.: 9,893

[22] Filed: Feb. 2, 1987

[51] Int. Cl.$^4$ .................... B32B 23/00; B32B 5/16
[52] U.S. Cl. .................... 428/326; 428/359; 428/361; 428/378; 428/393; 428/526; 428/528
[58] Field of Search ............... 428/326, 359, 361, 378, 428/393, 526, 528

[56] References Cited

U.S. PATENT DOCUMENTS

| | | | |
|---|---|---|---|
| 4,107,110 | 8/1978 | Lachowicz et al. | 428/375 X |
| 4,241,133 | 12/1980 | Lund et al. | 428/326 |
| 4,323,625 | 4/1982 | Coran et al. | 428/361 |
| 4,376,144 | 3/1983 | Goettler | 428/361 X |
| 4,381,332 | 4/1983 | Fulmer et al. | 428/361 X |
| 4,414,267 | 11/1983 | Coran et al. | 428/361 X |

*Primary Examiner*—George F. Lesmes
*Assistant Examiner*—M. A. Katz
*Attorney, Agent, or Firm*—Sim & McBurney

[57] ABSTRACT

Composites are made from cellulose fibers dispersed in a matrix of polyethylene and an isocyanate and bonded thereto during subsequent extrusion and or molding. The isocyanate improves adhesion between the cellulose fibers and the polyethylene. The improved adhesion results in improved tensile properties in the composite.

23 Claims, No Drawings

BONDED COMPOSITES OF CELLULOSE FIBERS POLYETHYLENE

FIELD OF INVENTION

This invention relates to composites of cellulose-based fibers dispersed in a matrix of polyethylene and to treated cellulose fibers which have improved dispersability into polymer and improved adhesion thereto. More specifically, it relates to such reinforced thermoplastic composites which have good strength and molding characteristics and are derived from readily available cheap component.

BACKGROUND TO THE INVENTION

There have been a number of prior proposals to prepare composites which consist essentially of thermosetting or thermoplastic resinous matrix materials having dispersed therein inorganic reinforcing fillers. Such materials are described, for example, in U.S. Pat. Nos. 3,764,456 and 4,442,243, which describe mica-reinforced thermoplastic composites having improved durability, physical and aesthetic properties which are prepared by mixing the resin and the mica in the presence of propylene polymer wax. The mica may be pretreated to provide functional groups thereon for subsequent chemical reaction with the propylene polymer wax.

The use of inorganic fillers, such as mica, does however present certain technical difficulties. Mica is a difficult material to process in making such composites, and is abrasive, so that it tends to wear out processing machinery which it contacts.

In addition, the prior art has disclosed the use of cellulosic fillers as additives for both thermoplastic and thermosetting resins. Such fillers have been derived from the finely ground products of wood pulp, the shells of peanuts or walnuts, corn cobs, rice hulls, vegetable fibers or certain bamboo-type reeds or grasses.

The great abundance and cheapness of such cellulosic materials in every part of the globe has made these cellulosic materials attractive sources for producing useful fillers on thermoset resins (such as the phenolics) has been an accepted practice for many years, their use in thermoplastics has been limited mainly as a result of difficulties in dispersing the cellulose particles in thermoplastic melts, poor adhesion (wettability) and in consequence inferior mechanical properties of the molded composites.

The dispersion of discontinuous cellulose based fibers into polymeric matrix can be greatly improved by pretreatment of the fibers with a plastic polymer and a lubricant, as described in U.S. Pat. No. 3,943,079. In U.S. Pat. No. 4,376,144, composites made from cellulose fibers dispersed in a matrix of plasticized vinyl chloride polymer are described wherein a cyclic trimer of toluene diisocyanate is used to improve adhesion.

U.S. Pat. No. 4,323,625 describes composites produced from grafted olefin polymers and cellulose fibers. The polyolefins employed have been grafted with other polymers carrying methylol phenolic groups before being combined with cellulosic fibers and bonding agents, such as phenol-aldehyde resin, a polyisocyanate or the like.

U.S. Pat. No. 4,107,110 describes α-cellulose fibers coated with a graft copolymer comprising 1,2-polybutadiene to which is grafted an acrylate such as butylmethacrylate for reinforcing of polyethylene and other plastic compositions. Japanese patent publication No. 137,243/78 also describes a cellulosic material which has been acetylated with gaseous acetic anhydride as a reinforcing agent for polyolefins.

U.S. Pat. No. 3,485,777 describes compatibilization of polyvinylchloride or poly(methyl methacrylate) with grafted cellulose. U.S. Pat. No. 3,645,939 also shows that polyethylene, or polyvinylchloride or acrylic rubber can be compatibilized with cellulosic fibers in the presence of an ethylenically-unsaturated carboxylic acid or anhydride under conditions which generate free radicals on the polymers, so that the ethylenically-unsaturated carboxylic acid or anhydride reacts with and couples with the thermoplastic polymer and the polyhydric polymer (i.e. cellulose).

U.S. Pat. No. 4,209,433 describes treating wood material with polyisocyanate before mixing with thermosetting phenol-formaldehyde resin. U.S. Pat. No. 4,241,133 describes mixing elongated wood flakes with a binder, which is a polyisocyanate, and then hot-pressing into the form of an elongated structural member, such as a beam or post.

British Pat. No. 1,585,074 describes a process of manufacturing cellulose-polyurethane material by reaction of fibrous cellulosics with impregnated polyisocyanates in the presence of a catalyst, which is zinc octoate.

SUMMARY OF THE INVENTION

It has now been found that the adhesion of cellulosic fibers to a matrix formed by a polyethylene polymer can be substantially improved by incorporating therewith bonding agents containing isocyanates.

Accordingly, the present invention provides a composite, comprising discontinuous cellulose fibers dispersed in a matrix of polyethylene and bonded thereto through a bonding agent containing at least one isocyanate group.

It has been also found that discontinuous cellulosic fibers, when coated with polymer gives better adhesion when incorporated with polyethylene matrix if the polymer coating includes a small amount of the bonding agent.

In the present invention, small quantities of isocyanates are employed to improve adhesion between the cellulose fibers and the polyethylene. A large variety of compounds may be employed as the bonding agent, provided that such compound contains at least one isocyanate group.

Among the compounds which may be employed are alkyl isocyanates which contain at least one isocyanate group. The alkyl isocyanate may contain a single isocyanate group and one example of such a compound is ethyl isocyanate. Alkyl isocyanates comprising two isocyanate groups located at the ends of an alkylene chain and one example of such a compound is 2,6-hexamethylene diisocyanate.

Also included among the compounds which may be employed are aryl isocyanates which contain at least one isocyanate group. The aryl isocyanate may contain multiple ring-attached isocyanate groups and one example of such a compound is toluene-2,4-diisocyanate, which also may be employed in the form of its cyclic trimer. The aryl isocyanate also may comprise a polyphenyl compound in which each ring has an isocyanate attached thereto and one example of such a compound is linear polymethylene polyphenylisocyanate, i.e. the compound of the formula:

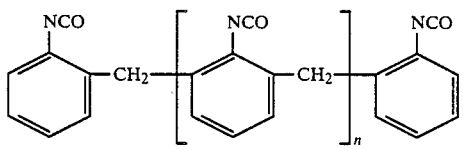

Nowhere in the known art set forth above is there described or suggested that small quantities of isocyanates may be employed to improve adhesion between cellulosic fibers and polyethylenes, to provide composites having good strength and molding characteristics. The present invention enables cheap raw materials in the form of cellulosic fibers to be employed effectively in making composites.

The composites of the invention may contain a wide range of quantity of cellulosic fibers by weight, based on the total weight of composite, generally about 1 to about 50%, preferably about 5 to about 35%.

The bonding agent has been found to be effective at relatively low concentrations of the polyethylene in the matrix, as low as 0.1 wt.% of the polyethylene, but more usually in the range of about 1 to about 10 wt.%.

The present invention also includes cellulosic fibers treated with a small amount of the isocyanate and coated with polyethylene for use as a pre-mix for subsequent dispersion in the polyethylene matrix.

The cellulosic fibers used herein can be characterized as "discontinuous" to distinguish them from the well known incorporation of continuous cord reinforcement into rubber and plastic articles. The "matrix" is the material forming a continuous phase which surrounds the fibers. A "composite" is the combination of discontinuous fibers in a matrix wherein the contained fibers may be randomly oriented, or, to a greater or lesser degree, aligned in a particular direction.

DESCRIPTION OF PREFERRED EMBODIMENTS

The cellulosic material used in the invention include cellulosic fibers derived from softwood or/and hardwood pulps (e.g. chemical or mechanical or chemi-mechanical or high-yield or ultrahigh yield or thermomechanical or refiner or stone groundwood or chemi-thermomechanical pulp or explosion pulp); nut shells, corn cobs, rice bulbs, vegetable fibers, certain bamboo-type reeds grasses, bagasse, cotton, rayon (regenerated cellulose), sawdust, (wood shavings), and the like. Preferred are wood fibers derived from wood pulp, e.g. chemi-thermomechanical aspen pulp or thermomechanical pulp or sawdust. There are many available types of wood pulp which may be classified according to whether they were derived by chemical or mechanical treatment or combination of both one, as well known in the pulp and paper industry. Waste pulp and recycled paper pulp can also be used. The fibers may have an aspect ratio (length divided by diameter) ranging from about 2 to about 5 for mechanical pulps as well as for sawdust and wood flour, about 15 to about 50 from chemi-mechanical and chemi-thermomechanical pulps and about 50 to about 150 for low yield chemical pulps. In some instances, it is desirable to use mixtures of fibers having widely differing aspect ratios.

The polymer used in the matrix is polyethylene and includes both ethylene homopolymers and copolymer of a major proportion of ethylene with minor proportion, generally about 1 to about 25 wt.%, of other olefin monomers, for example, propylene or hexine. The polymer polyethylene includes low density polyethylenes which generally have a density from about 0.915 to about 0.935, including linear low density polyethylene, and high density polyethylenes, which generally have a density of about 0.935 to about 0.960. Included are polyethylenes prepared under low or high pressure conditions.

As noted earlier, in the present invention, an isocyanate is used to improve adhesion between the cellulosic fibers and the polyethylene. Examples of specific isocyanates which may be used in the present invention now will be described.

One such isocyanate is a linear polymethylene polyphenylisocyanate of the formula:

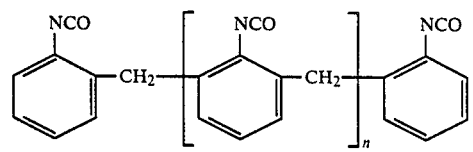

wherein n is an integer of varying value, abbreviated herein as PMPPIC. The PMPPIC can be of low, medium or high viscosity depending on degree of polymerization, (i.e. value of n), and can be in analytical as well as technical grade. The technical grade can be formed by mixture of major proportion of PMPPIC with a minor proportion of another isocyanate, for example, 4,4'-diphenylmethane diisocyanate and/or an adduct of the formula:

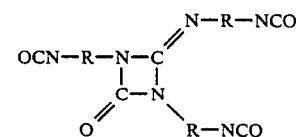

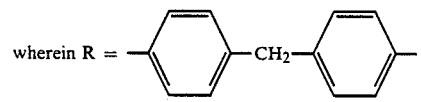

Another example of the bonding agent is the cyclic polymer form of toluene diisocyanate. The preferred form of this example is the isocyanurate trimer, represented by structural formula:

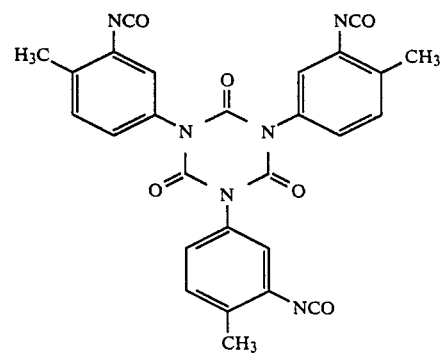

The bonding agent is used in the composites of the invention in sufficient amount to achieve an adhesive bond between the polyethylene and the cellulosic fibers.

This amount can be as little as 0.1% by weight of polyethylene, up to 10% by weight or more, on the same basis. The amount of bonding agent required can also be expected to vary with the amount of cellulosic fiber present. In general, with 40% by weight of cellulosic fibers present in composites, the best properties are obtained at 5% by weight of isocyanate based on polymer weight or 7.5% by weight of bonding agent based on cellulosic fiber weight. With 30% of cellulosic fibers loading, 5.5% by weight of bonding agent based on fiber weight are going to give optimal results.

The precise mechanism whereby the bonding occurs is not known, but it is highly probable that the active isocyanate moieties in the bonding agent react with the hydroxyl groups on the cellulosic fibers, forming a chemical bonding as follows:

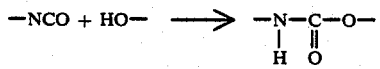

The bonding agent can be used either as it is or in solution in a convenient, compatible, non-reactive solvent in order to facilitate dispersion of the active material through the composites. The bonding agent can be incorporated into the composites of the invention by mixing the bonding agent therewith, before or at the same time the fibers are combined with the polyethylene, and other ingredients. If the bonding agent is added in solvent solution, the solvent will usually be removed prior to the final shaping of the compound. In the case when the plasticizer solution form of bonding agent is employed, however, this step is unnecessary.

Alternatively, the bonding agent may be combined with the cellulosic fibers in a pre-treating step. The fibers can be grafted with a bonding agent so as to enhance their dispersability into a composite by admixture thereto of organic polymer which then can be processed as a thermoplastic substance, in an amount sufficient to reduce fiber-to-fiber affinity. Preferably, the organic polymer is polyethylene, although other compatible polymers, having solubility parameters at midpoint of range within one unit of that of polyethylene can be used. It was observed that the pre-treated fibers which contain the bonding agent show a considerable improvement in their dispersability into a polymeric matrix over fibers treated only with organic polymer without the isocyanate bonding agent.

The pre-treating step can usually be performed in an internal mixer, such as a Banbury mixer, Brabender mixer, CSI-MAX mixing extruder or on roll mill. The order of addition of material to the mixer is not critical. The polyethylene, cellulosic fibers, bonding agent and other ingredients can all be charged initially. The temperature of mixing is a function of the ingredients and equipments used. In general, the temperatures used in a roll-mill are about 10° to 15° C. higher than that used in extruder. The proportions of the ingredients are dictated by the resulting composite properties. The amount of polymer used generally should be high enough to prevent fiber-to-fiber interaction, usually at least 3 parts of polyethylene by weight per 100 parts by weight of wood fibers. Usually, no more than 15 parts of polyethylene by weight per 100 parts of fibers by weight are used, although a higher polymer level can be employed if desired. The level of bonding agent(s) usually ranges from about 0.5 parts up to 15 parts or more of bonding agent(s) by weight per 100 parts by weight of fiber. In most instances, it is convenient to include all of the bonding agent in the treated fibers since no further additions of this ingredient need be added in making the final composite. Since the treatment step coats the surface of the fibers to a certain extent, the polymer present in the coating will be in a position to be bonded to the fibers. Some additional bonding of the fiber to polyethylene in the matrix is achieved during the composite formation.

The composites of the invention are usually made from non-treated cellulosic fibers. For linear low density polyethylene, the use of pre-coated fibers leads to stronger composites.

Fibers, treated or not, are mixed with polymer matrix to form a composite usually in an internal mixer, extruder or on a roll mill. Additional ingredients, such as fillers, plasticizers, stabilizers, colorants, etc. can also be added at this point. Inorganic filler material may be selected from mica, talc, $CaCO_3$, silica, glass fibers, asbestos or wollastonite. The range of quantity of such additional materials may vary widely, for example, up to about 50 wt.% of a plasticizer and up to about 40% of inorganic filler may be added.

EXAMPLES

EXAMPLE I

Chemithermo-mechanical aspen pulp, having the properties as set forth in Table I below, was predried in a circulating air oven for 12 hours at 65° C. Zero to five weight percent of polymethylene polyphenylisocyanate (PMPPIC) based on polymer weight was pre-mixed with polyethylene HDPE (density=0.954 g/cc, M.I.=7.5 g/10 min) at room temperature, followed by mixing in a CS1-max extruder, Model CS-194, with different weight percentages (10, 20, 30, 40) of the wood fibers. The mixing temperatures used were between 140° and 150° C. The extruded composite was allowed to cool down to room temperature and ground to mesh size 20.

The composites produced were compression molded into shoulder-type test specimens at a molding temperature of 160° C., molding time of 25 minutes and pressure 2.7 MPa. The cooling time was 15 minutes at a pressure of 0.5 MPa. The tensile properties of the composites were evaluated on Instron tester (Model 4201) using the Instron A 479-521 Plastic Tensile Test Program. The reported properties are those measured at yield point. The reported modulus is elastic modulus measured as a secant modulus defined by initial force 0.05 kN and force 0.08 kN. Tensile data so generated are presented in Table II below.

As may be seen from the Table II, the addition of fiber causes an increase in the Young's Modulus from 966 MPa to 1230 MPa at 40% of fiber addition but bonding and good interface interaction is required to gain tensile strength. At forty percent of fiber addition, the strength has increased from 15 to 32, 39.5 and 3.95 MPa of 0%, 1%, 3% and 5% of PMPPIC present in polymer. The modulus also increased in a similar way from 1230 to 1979, 1801 and 1900 MPa in case of 0%, 1%, 3% and 5% of PMPPIC addition.

EXAMPLE II

Composites were made and evaluated as described in Example I, except that PMPPIC was substituted for by 1% of 1-, 6-hexamethylene diisocyanate (HMDIC). The results obtained are presented in Table III below. As may be seen therefrom good reinforcement properties of fibers are obtained in the presence of HMDIC.

EXAMPLE III

Composites were made and evaluated as described in Example I, except that PMPPIC was substituted for by toluene 2-4-diisocyanate (TIC). The mechanical properties of composites are presented in Table IV below. As may be seen therefrom, good reinforcement properties are obtained in the presence of TIC.

EXAMPLE IV

Composites were made and evaluated as described in Example I, except that PMPPIC was substituted for by ethyl isocyanate (EIC). The results obtained are set forth in Table V below.

EXAMPLE V

Composites were made and evaluated as described in Example I, except that CTMP-aspen was substituted for by low yield (47%), low lignin (less than 0.1%) bleached kraft aspen pulp. The mechanical properties obtained are set forth in Table VI below and compare well with the properties obtained when CTMP-aspen was used (Table II).

EXAMPLE VI

Composites were prepared and evaluated as described in Example I, except that pre-coated fibers were used in the mixing step. The wood fibers were pre-coated with a mixture of 5% of maleated polypropylene wax (Eastman Chemical Epolene E-43 wax), polyethylene which was used in matrix (10%) and PMPPIC (3%) on roll mill at temperature 160° C. mixing time five minutes. Typical properties obtained are presented in Table VII below.

EXAMPLE VII

Composites were prepared and evaluated as described in Example I, except that the polyethylene used as the matrix was linear low density polyethylene with a density of 0.934 g/cc and melt index of 5 g/10 min. The results obtained are presented in Table VIII below.

EXAMPLE VIII

Composites were prepared and evaluated as described in Example VI, except that the polyethylene used as the matrix was polyethylene having a density of 0.934 g/cc and melt index of 5 g/10 min. The results obtained are set forth in Table IX below.

EXAMPLE IX

Composites were prepared and evaluated as described in Example I, except that the polyethylene used as the matrix was linear low density polyethylene with a density of 0.918 g/cc and a melt index of 1 g/10 min. The results obtained are set forth in Table X below.

EXAMPLE X

Composites were prepared and evaluated as described in Example VI, except that the polyethylene was a 0.918 g/cc density polyethylene, (melt index = 1 g/10 min). The results obtained are set forth in Table IX below.

EXAMPLE XI

Composites were prepared and evaluated as described in Example I, except that the polyethylene used as the matrix was a high pressure, low density polyethylene, (density = 0.925, melt index = 2 g/10 min). The reinforcing fiber effect for modulus as well as for stress are set forth in Tables XII and XIII below.

EXAMPLE XII

Composites were prepared and evaluated as described in Example I except that the polyethylene used as the matrix was a high pressure, low density polyethylene of the type described in Example XI and CTMP-aspen was substituted for by low yield (48%), low lignin (less than 0.1%) sulfite spruce pulp. The results obtained are set forth in Tables XII, XIII and XIV below. As may be seen below even 0.5% of PMPPIC leads to modulus as well as stress increase.

EXAMPLE XIII

Composites were prepared and evaluated as described in Example I, except that CTMP-aspen was substituted for by aspen sawdust, Mesh 60. The results obtained are set forth in Table XV below.

EXAMPLE XIV

Composites were prepared and evaluated as described in Example I, except that CTMP-aspen was substituted for by softwood spruce or aspen sawdust, Mesh 60. The results obtained are set forth in Table XVI below.

As may be seen from the results set forth in the above Examples, PMPPIC is very effective with any kind of cellulosic fibers prepared by chemical means (kraft, sulfite) or chemi-mechanical means (CTMP) or mechanical means (mechanical pulps, sawdust). In addition, there is not negative effect on matrix reinforcement when PMPPIC is used by reason of the presence of lignin.

SUMMARY OF DISCLOSURE

In summary of this disclosure, the present invention provides novel composites of polyethylene with cellulosic fibers wherein adhesion between the polyethylene and the cellulosic fibers is improved by using isocyanates, thereby enhancing the mechanical properties of products produced from the matrix. Modifications are possible within the scope of this invention.

TABLE I

| TYPICAL PROPERTIES OF CHEMITHERM-MECHANICAL ASPEN PULP (CTMP-ASPEN) | |
|---|---|
| Drainage Index (CSF), ml | 119 |
| Brightness, Elrepho (%) | 60.9 |
| Opacity, (%) | 91.4 |
| Breaking Length, km | 4.46 |
| Elongation, (%) | 1.79 |
| Tear Index, m N · m$^2$/g | 7.2 |
| Burst Index, k Pa · m$^2$/g | 2.59 |
| Yield (%) | 92.0 |
| Kappa Index No | 121.7 |
| Lignin (%) | 17.9 |

TABLE II

| COMPOSITE | LOAD (N) | ENERGY (KJ × 10$^5$) | MODULUS (MPa) |
|---|---|---|---|

TABLE II-continued

| COMPOSITE | LOAD (N) | | | | ENERGY (KJ × 10⁵) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + CTMP Aspen + 0% PMPPIC | 108 | 82 | 82 | 75 | 10.6 | 4.2 | 3.1 | 2.1 | 978 | 904 | 1095 | 1230 |
| HDPE + 1% PMPPIC + CTMP Aspen | 137 | 148 | 151 | 141 | 16.4 | 16.9 | 11.0 | 5.7 | 1091 | 1332 | 1471 | 1979 |
| HDPE + 3% PMPPIC + CTMP Aspen | 133 | 151 | 177 | 182 | 16.7 | 17.6 | 17.7 | 14.9 | 1013 | 1143 | 1634 | 1801 |
| HPDE + 0% CTMP Aspen | | 113.1 | | | | 14.6 | | | | 966 | | |
| HDPE + 5% PMPPIC + CTMP Aspen | 130 | 146 | 182 | 193 | 15.4 | 16.3 | 19 | 16 | 1142 | 1428 | 1494 | 1900 |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE + CTMP Aspen + 0% PMPPIC | 23.3 | 16.6 | 18 | 15 | 7.6 | 4.2 | 3.1 | 2.3 |
| HDPE + 1% PMPPIC + CTMP Aspen | 29 | 31 | 34 | 32 | 9.2 | 8.7 | 6.0 | 3.5 |
| HDPE + 3% PMPPIC + CTMP Aspen | 28 | 32 | 38 | 39.5 | 9.5 | 8.8 | 7.8 | 5.9 |
| HPDE + 0% CTMP Aspen | | 24.7 | | | | 9.8 | | |
| HDPE + 5% PMPPIC + CTMP Aspen | 29 | 32 | 38 | 39.5 | 9.1 | 8.3 | 7.9 | 6.4 |

HDPE ... Density = 0.954 g/cc, Melt Index = 7.5 g/10 min
PMPPIC ... polymethylene polyphenyl isocyanate

TABLE III

| COMPOSITE | LOAD (N) | | | | ENERGY (KJ × 10⁵) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + 1% HMDIC + CTMP Aspen | 119 | 124 | 131 | 136 | 8.0 | 8.2 | 6.5 | 4.3 | 1057 | 1329 | 1699 | 1887 |
| HDPE + 0% CTMP Aspen | | 113.1 | | | | 14.6 | | | | 966 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE + 1% HMDIC + CTMP Aspen | 26.7 | 27.5 | 29.5 | 28.3 | | | | |
| HDPE + 0% CTMP Aspen | | 9.8 | | | | | | |

HMDIC ... 1-6 Hexamethylene diisocyanate

TABLE IV

| COMPOSITE | LOAD (N) | | | | ENERGY (KJ × 10⁵) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + 1% TIC + CTMP Aspen | 124 | 143 | 139 | 120 | 13.2 | 12.8 | 7 | 3.5 | 1000 | 1266 | 1527 | 1961 |
| HDPE + 3% TIC + CTMP Aspen | 126 | 138 | 134 | 137 | 12.3 | 14.3 | 8.7 | 5.7 | 1012 | 1209 | 1501 | 1787 |
| HDPE + 0% CTMP Aspen | | 113.1 | | | | 14.6 | | | | 966 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE + 1% TIC + CTMP Aspen | 26.4 | 30.2 | 28.8 | 25.2 | 8.1 | 7.3 | 4.2 | 2.5 |
| HDPE + 3% TIC + CTMP Aspen | 26 | 29 | 29.7 | 29 | 7.8 | 7.8 | 5.4 | 3.6 |
| HDPE + 0% CTMP Aspen | | 24.7 | | | | 9.8 | | |

TIC ... Toluene 2,4 diisocyanate

TABLE V

| COMPOSITE | LOAD (N) | | | | ENERGY (KJ × 10⁵) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + 1% EIC + CTMP Aspen | 111 | 98 | 85 | 83 | 9.9 | 5.9 | 3.1 | 1.9 | 1103 | 1322 | 1536 | 1793 |
| HDPE 0% CTMP Aspen | — | 113.1 | — | — | | 14.6 | | — | | 966 | | |

| | STRESS | ELONGATION |
|---|---|---|

TABLE V-continued

| COMPOSITE | (MPa) | | | | (%) | | | |
|---|---|---|---|---|---|---|---|---|
| FIBER (%) | 10 | 20 | 30 | 40 | 10 | 20 | 30 | 40 |
| HDPE + 1% EIC + CTMP Aspen | 26.4 | 22.3 | 18.8 | 18.7 | 6.9 | 4.7 | 2.8 | 1.9 |
| HDPE 0% CTMP Aspen | | | 24.7 | | | | 9.8 | |

EIC ... ethylisocyanate

TABLE VI

| COMPOSITE | LOAD (N) | | | | ENERGY (KJ × $10^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + 3% PMPPIC Kraft Aspen | 126 | 146 | 160 | 168 | 13.4 | 12.8 | 13.9 | 14.5 | 1054 | 1307 | 1656 | 1630 |
| HDPE 0% CTMP | | 113.1 | | | | 14.6 | | | | 966 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE + 3% PMPPIC Kraft Aspen | 26 | 30 | 33 | 35 | 8.2 | 6.7 | 6.9 | 6.9 |
| HDPE 0% CTMP | | | 24.7 | | | | 9.8 | |

TABLE VII

| COMPOSITE | LOAD (N) | | | | ENERGY (KJ × $10^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE + Precoated CTMP Aspen (PMPPIC: 3% Epolene: 5% HDPE: 10%) | 125 | 132 | 143 | 157 | 17.4 | 14 | 11 | 7.6 | 959 | 1261 | 1522 | 1766 |
| HDPE + 0% CTMP Aspen | | 113.1 | | | | 14.6 | | | | 966 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE + Precoated CTMP Aspen (PMPPIC: 3% Epolene: 5% HDPE: 10%) | 26 | 27 | 30 | 33 | 8.6 | 6.4 | 6.1 | 4.2 |
| HDPE + 0% CTMP Aspen | | | 24.7 | | | | 9.8 | |

TABLE VIII

| COMPOSITE | LOAD (N) | | | | ENERGY (KJ × $10^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| LLDPE-0534-A + 3% PMPPIC + CTMP Aspen | 64 | 79 | 117 | 116 | 6.4 | 6.3 | 4.1 | 8.0 | 489 | 684 | 1093 | 1173 |
| LLDPE-0534-A 0% CTMP | | 68 | | | | 12.9 | | | | 375 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| LLDPE-0534-A + 3% PMPPIC + CTMP Aspen | 14.8 | 17.0 | 22.1 | 24.5 | 8.0 | 7.3 | 6.2 | 5.6 |
| LLDPE-0534-A 0% CTMP | | | 14.6 | | | | 13.9 | |

LLDPE-0534-A ... Density = 0.934 g/cc, Melt Index = 5 g/10 min.

TABLE IX

| COMPOSITE | LOAD (N) | | | | ENERGY (KJ × $10^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| LLDPE-0534-A + Precoated CTMP Aspen (PMPPIC: 3% Epolene: 5% LLDPE: 10%) | 75 | 83 | 95 | 110 | 11.1 | 11.6 | 10.3 | 9.8 | 568 | 643 | 736 | 999 |
| LLDPE-0534-A + 0% CTMP | | 68 | | | | 12.9 | | | | 375 | | |

TABLE IX-continued

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| LLDPE-0534-A + Precoated CTMP Aspen (PMPPIC: 3% Epolene: 5% LLDPE: 10%) | 17.3 | 19.2 | 21.5 | 24.9 | 11.1 | 10.3 | 8.4 | 7.1 |
| LLDPE-0534-A + 0% CTMP | | 14.6 | | | | 13.9 | | |

TABLE X

| COMPOSITE | LOAD (N) | | | | ENERGY (KJ × 10$^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| LLDPE-0118-A + 3% PMPPIC + CTMP Aspen | | | | | — | 21.1 | 21.4 | — | — | 336 | 431 | 592 |
| LLDPE-0118-A + 0% PMPPIC + CTMP Aspen | | | | | 6.5 | 3.7 | 2.4 | — | 265 | 238 | 430 | 489 |
| LLDPE-0118-A + 0% CTMP Aspen | | | | | | 24.2 | | | | 192 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| LLDPE-0118-A + 3% PMPPIC + CTMP Aspen | — | 12.2 | 14.1 | — | — | 5.0 | 5.1 | — |
| LLDPE-0118-A + 0% PMPPIC + CTMP Aspen | 9.4 | 8.2 | 6.9 | 8.1 | 10.4 | 6.1 | 5.4 | 5.1 |
| LLDPE-0118-A + 0% CTMP Aspen | | .9.5 | | | | 33.8 | | |

LLDPE-0118-A ... Density = 0.918 g/cc, Melt Index = 1 g/10 min.

TABLE XI

| COMPOSITE | LOAD (N) | | | | ENERGY (KJ × 10$^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| LLDPE-0118-A + Coated CTMP Aspen PMPPIC: 3% EPOLEME: 5% LLDPE: 10% | | | | | 15.9 | 25.6 | 21.6 | 15.7 | 307 | 360 | 425 | 469 |
| LLDPE-0118-A + 0% CTMP Aspen | | | | | | 24.2 | | | | 192 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| LLDPE-0118-A + Coated CTMP Aspen PMPPIC: 3% EPOLEME: 5% LLDPE: 10% | 11.4 | 12.1 | 12.9 | 14.6 | — | 5.1 | 5.1 | 5.1 |
| LLDPE-0118-A + 0% CTMP Aspen | | 9.5 | | | | 33.8 | | |

TABLE XII

| COMPOSITE | LOAD (N) | | | | ENERGY (KJ × 10$^5$) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| LDPE + 3% PMPPIC CTMP Aspen | | | | | 6.6 | — | 6.0 | 6.5 | 147 | 318 | 446 | 633 |
| LDPE + 0.5% PMPPIC + low yield spruce pulp | | | | | — | — | — | — | 290 | 290 | 415 | 560 |
| LDPE + 0% PMPPIC + low yield spruce pulp | | | | | | | | | 315 | 330 | 365 | 495 |
| LDPE | | | | | | 37.5 | | | | 184 | | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |

TABLE XII-continued

| | | | | | | | | |
|---|---|---|---|---|---|---|---|---|
| LDPE + 3% PMPPIC CTMP Aspen | 6.8 | — | 14.0 | 18.8 | 5.1 | — | 5.0 | 5.0 |
| LDPE + 0.5% PMPPIC + low yield spruce pulp | 13.1 | 13.2 | 14.8 | 18.3 | — | — | 6.2 | 5.9 |
| LDPE + 0% PMPPIC + low yield spruce pulp | 11.1 | 10.8 | 8.9 | 9.5 | — | — | 5.6 | 3.2 |
| LDPE | | | 7.4 | | | | 5.1 | |

LDPE . . . Density = 0.925 g/cc, Melt Index = 2 g/10 min.

TABLE XIII (AT BREAK)

| COMPOSITE | LOAD (N) | | | | ENERGY (KJ × 10⁵) | | | | MODULUS (MPa) | | | |
|---|---|---|---|---|---|---|---|---|---|---|---|---|
| FIBRE (%) | 10 | 20 | 30 | 40 | 10 | 20 | 30 | 40 | 10 | 20 | 30 | 40 |
| LDPE + 3% PMPPIC + CTMP Aspen | 28 | 45 | 57 | 83 | 11.1 | 9.0 | 7.1 | 7.6 | 207 | 381 | 556 | 731 |
| LDPE, low yield spruce | | | | | | | | | 315 | 330 | 365 | 495 |
| LDPE + 3% PMPPIC + low yield spruce | | | | | | | | | 290 | 290 | 415 | 560 |
| LDPE + 0% CTMP Aspen | | 18.7 | | | | 85.9 | | | | 201 | | |

| COMPOSITE | STRESS (MPa) | | | | ELONGATION (%) | | | |
|---|---|---|---|---|---|---|---|---|
| FIBRE (%) | 10 | 20 | 30 | 40 | 10 | 20 | 30 | 40 |
| LDPE + 3% PMPPIC + CTMP Aspen | 6.5 | 9.5 | 12 | 19 | 18 | 8.4 | 6.2 | 7.0 |
| LDPE, low yield spruce | | | | | — | — | 5.6 | 3.2 |
| LDPE + 3% PMPPIC + low yield spruce | | | | | — | — | 8 | 6.5 |
| LDPE + 0% CTMP Aspen | | 4.1 | | | | 125.4 | | |

TABLE XIV

| COMPOSITE | LOAD (N) | | | | ENERGY (KJ × 10⁵) | | | | MODULUS (MPa) | | | | STRESS (MPa) | | | | ELONGATION (%) | | | |
|---|---|---|---|---|---|---|---|---|---|---|---|---|---|---|---|---|---|---|---|---|
| FIBER (%) | 10 | 20 | 30 | 40 | 10 | 20 | 30 | 40 | 10 | 20 | 30 | 40 | 10 | 20 | 30 | 40 | 10 | 20 | 30 | 40 |
| LDPE — 0% PMPPIC — low yield spruce pulp | | | | | | | | | 295 | 320 | 450 | 545 | 11.4 | 10.1 | 12.0 | 10.8 | — | — | 4.1 | 2.2 |
| LDPE — 0.5% PMPPIC — low yield spruce pulp | | | | | | | | | 310 | 360 | 520 | 615 | 13.4 | 14.6 | 17.7 | 19.0 | — | — | 6.9 | 5.2 |
| LDPE | | | | | | | | | | 184 | | | | 7.4 | | | | 5.1 | | |

Low Yield Spruce . . . Bisulfite low yield spruce pulp.

TABLE XV

| COMPOSITE | LOAD (N) | | | | ENERGY (KJ × 10⁵) | | | | MODULUS (MPa) | | | |
|---|---|---|---|---|---|---|---|---|---|---|---|---|
| FIBER (%) | 10 | 20 | 30 | 40 | 10 | 20 | 30 | 40 | 10 | 20 | 30 | 40 |
| HDPE | | 113.1 | | | | 14.6 | | | | 966 | | |
| HDPE + Sawdust Aspen | 120 | 127 | 113.3 | | 12.4 | 8.2 | 3.5 | | 1046 | 1440 | 1719 | |
| HDPE + 3% PMPPIC + Aspen Sawdust | 122 | 131 | 161 | | 10.7 | 9.8 | 11.7 | | 1194 | 1338 | 1631 | |
| HDPE + Spruce Sawdust | 125 | 124 | 118 | | 13.4 | 8.2 | 5.9 | | 1021 | 1241 | 1608 | |
| HDPE + 3% PMPPIC + Spruce Sawdust | — | 134 | 146 | | — | 11.0 | 11.1 | | — | 1327 | 1729 | |

| COMPOSITE | STRESS (MPa) | | | | ELONGATION (%) | | | |
|---|---|---|---|---|---|---|---|---|
| FIBER (%) | 10 | 20 | 30 | 40 | 10 | 20 | 30 | 40 |
| HDPE | | 24.7 | | | | 9.8 | | |
| HDPE + Sawdust Aspen | 25.9 | 26.6 | 23.7 | | 7.9 | 5.2 | 4.9 | |
| HDPE + 3% PMPPIC + Aspen Sawdust | 27.4 | 29.3 | 33.3 | | 7.0 | 6.1 | 6.1 | |
| HDPE Spruce Sawdust | 27.1 | 26.4 | 25.4 | | 8.3 | 5.4 | 4.0 | |
| HDPE + 3% PMPPIC + Spruce Sawdust | — | 20.8 | 33.2 | | — | 6.5 | 6.1 | |

I claim:

1. A composite consisting essentially of discontinuous cellulose fibers dispersed in a matrix of polyethylene and bonded thereto through a compound containing at least one isocyanate group, said polyethylene being selected from the group consisting of homopolymers of ethylene and copolymers of a major proportion of ethylene and a minor portion of a higher olefin, said compound being present in an amount of about 0.1 to about 10 wt. % of the composite.

2. The composite claimed in claim 1 wherein said discontinuous fibers comprise from about 1 to about 50% by weight of the composite.

3. The composite claimed in claim 2 wherein said cellulosic fibers are formed from a wood pulp selected from the group consisting of hardwood pulp, softwood pulp and mixtures thereof.

4. The composite claimed in claim 3 wherein said fibers have an aspect ratio of from about 2 to about 150.

5. The composite claimed in claim 3 wherein said cellulosic fiber is wood flour or sawdust.

6. The composite of claim 1 wherein the polyethylene is linear low density polyethylene having a density from about 0.915 to about 0.935.

7. The composite of claim 1 wherein said compound is alkyl isocyanate containing at least one isocyanate group.

8. The composite of claim 1 wherein said alkyl isocyanate contains a single isocyanate group.

9. The composite of claim 8 wherein said alkyl isocyanate is ethyl isocyanate.

10. The composite of claim 7 wherein said alkyl isocyanate contains two isocyanate groups at the ends of an alkylene group.

11. The composite of claim 10 wherein said alkyl isocyanate is hexamethylene diisocyanate.

12. The composite of claim 1 wherein the bonding agent is an aryl isocyanate containing at least one isocyanate group.

13. The composite of claim 12 wherein the aryl isocyanate contains multiple ring-attached isocyanate groups.

14. The composite of claim 13 wherein the aryl isocyanate comprises toluene 2,4-diisocyanate.

15. The composite of claim 14 wherein said toluene-2,4-diisocyanate is employed in the form of its cyclic trimer.

16. The composite of claim 13 wherein the aryl isocyanate comprises a polyphenyl compound in which each ring has an isocyanate attached thereto.

17. The composite of claim 16 wherein the aryl isocyanate is linear polymethylene polyphenylisocyanate.

18. The composite of claim 1 also containing up to about 50 wt.% of plasticizer.

19. The composite of claim 1 also containing up to about 40 wt.% of inorganic filler.

20. The composite of claim 19 wherein said inorganic filler is selected from the group consisting of mica, talc, calcium carbonate, silica, glass fiber, asbestos and wollastonite.

21. Cellulosic fibers coated with polyethylene and bonded thereto through a compound containing at least one isocyanate group, said polyethylene being selected from the group consisting of homopolymers of ethylene and copolymers of a major proportion of ethylene and a minor portion of a higher olefin, said compound being present in an amount of about 0.1 to about 10 wt. % of the composite.

22. The fibers of claim 21 containing about 3 to about 15 wt.% polyethylene.

23. The fibers of claim 22 containing about 0.5 to about 15 wt.% of the isocyanate.

* * * * *